Oct. 28, 1969  J. F. COLLINS ET AL  3,475,565
RESONANT-PEAK MOTION OF BEAM-SHAPED MECHANOELECTRIC
AUDIO-FREQUENCY TRANSDUCERS DAMPED BY LIMITED
FLUOROCARBON POLYMER VOLUME

Filed Feb. 15, 1967  2 Sheets-Sheet 1

PERFORMANCE INDEX CV²
vs.
DAMPING PLACEMENT

BEAM RESONANT FREQ.
vs.
DAMPING PLACEMENT

HIGH FREQ. RESPONSE LIMIT
vs.
DAMPING PLACEMENT

PEAK RESPONSE DEVIATION
vs.
DAMPING PLACEMENT

United States Patent Office 3,475,565
Patented Oct. 28, 1969

3,475,565
RESONANT-PEAK MOTION OF BEAM-SHAPED MECHANOELECTRIC AUDIO-FREQUENCY TRANSDUCERS DAMPED BY LIMITED FLUOROCARBON POLYMER VOLUME
Jerome F. Collins, Westbury, and Morris S. Shatavsky, White Plains, N.Y., assignors to Sonotone Corporation, Elmsford, N.Y., a corporation of New York
Filed Feb. 15, 1967, Ser. No. 616,276
Int. Cl. H04r 1/16, 9/12, 11/08
U.S. Cl. 179—100.41
9 Claims

ABSTRACT OF THE DISCLOSURE

A phonograph pickup or other audio-frequency transducer device with an elongated transducer beam has a limited volume of a non-creeping grease-like fluorocarbon damping polymer confined along its resonant-peak-beam portion for limiting its resonant-peak beam vibration amplitude and response to near its constant-velocity or linear vibration amplitude and response. Advantageously a halofluorocarbon polymer grease is used as the damping polymer.

---

This invention relates to audio-frequency transducer devices operating with a flat strip-shaped elongated mechanoelectric transduced beam which transduces motion signals into corresponding electric signals and vice versa, such as known piezoelectric or piezoresistive transducer beams.

As an example, one type of widely used phonograph pickups operate with such elongated flat transducer beam supported for vibration in a housing chamber with a free end of the transducer beam driven by a stylus for transducing groove undulation records into corresponding electric signal response or output. At its resonant frequency, such transducer beam has a disturbing excessive resonant peak vibration amplitude along its resonant peak beam portion. In most pickups, the transducer beam is supported for vibration with a free-beam mode, and its resonant peak portion is near the beam center. If the most inward end of the transducer beam is held rigid by a massive mounting support, the stylus-driven front-end portion of the transducer beam will vibrate with the excessive resonant-peak beam amplitude.

In the past, the excessively large and disturbing resonant peak motion amplitude of the transducer beam was usually damped by a generally centrally positioned elastomer damping body. See U.S. Patents Dieter et al. 2,955,170, damper pad 28; Palo 2,848,559, damper pad 14; or Cordes 2,575,999, damper pad 21. In the pickups of U.S. Patents 2,879,413 (Smith-Johannsen) and 2,519,185 (Harris), the excessive resonant peak transducer beam motion is damped by a viscous fluid filling all or almost all space of the transducer housing chamber. In all these and other prior transducer-beam pickups, the elastomer or viscous fluid damper body—in addition to limited suppression of the resonant-peak beam motion—exerted on the vibration transducer beam excessive restraining forces which materially lowered the vibration amplitude of the desired signal transducing motion and thereby unduly reduced the desired signal output or response over the desired frequency range extending, for example, from about 300 to 1400 cycles per second and even higher.

Among the objects of the invention are acoustic devices and phonograph pickups operating with elongated flat transducer beams of the type described above which are provided with materially more effective flowable viscoelastic fluorine containing damping means for suppressing the excessive resonant peak amplitudes of the resonant-peak transducer beam portion without materially reducing the desired signal generating vibratory amplitudes imparted thereto by the phonograph stylus or the acoustic-device diaphragm.

The foregoing and other objects of the invention will be best understood from the following description and exemplifications thereof by reference to the annexed drawings wherein.

The principles of the invention will now be explained in connection with above-described transducer beams used in known-type stereophonic pickups seen in FIGS. 1 and 2. However, the invention is also applicable to generally similar-type transducer beams used in microphones, receivers and analogous diaphragm-type and other mechanoelectric transducer devices.

In accordance with the invention, a limited resonant peak-amplitude beam length portion of the transducer beam is damped by a surrounding limited volume of a non-Newtonian non-creeping grease-like fluorocarbon polymer held confined in a surrounding mounting or housing chamber portion. The small volume of the fluorocarbon damping polymer has a predetermined range of viscosity characteristics varying for different vibratory peak amplitudes of the resonant-peak portion of the transducer beam. These damping-grease viscosity characteristics exert damping forces which cause the peak-beam amplitude of the transducer beam resonant peak portion to remain near or at the linear-response or constant-velocity or other desired response vibration amplitude corresponding to other than resonant vibration frequencies.

The effectiveness of the small fluorocarbon damping volume is characterized by the transducer-beam performance index $CV^2$/Peak Response Deviation being at least about three times greater than obtainable under otherwise similar conditions with known type elastomer damping pads applied to damp the excessive transducer-beam resonant-peak amplitude. In the expression "CV²/Peak Response Deviation "C" means the compliance and "V" the voltage output of the transducer beam; and "Peak Response Deviation" means the opposite peak deviations of the transducer response from opposite sides of the linear or constant-velocity or the desired transducer response. Very good results are obtained with a damping grease consisting essentially of a halo-fluorocarbon polymer.

The Textbook of Polymer Science by F. W. Billmeyer, Jr., describes desirable flowable fluorocarbon polymers in chapter 16. The polymers described on pages 426 and 427 are most desirable. As an example, in practice very good results are obtained by mixing greases consisting essentially of low molecular-weight polymers of chlorotrifluoroethylene such as described in the pamphlet KEL-F Halofluorocarbon Oils, Waxes, Greases and Alkalines, copyright 1958 by the 3–M and sold under the trademark KEL-F.

Figure 1:
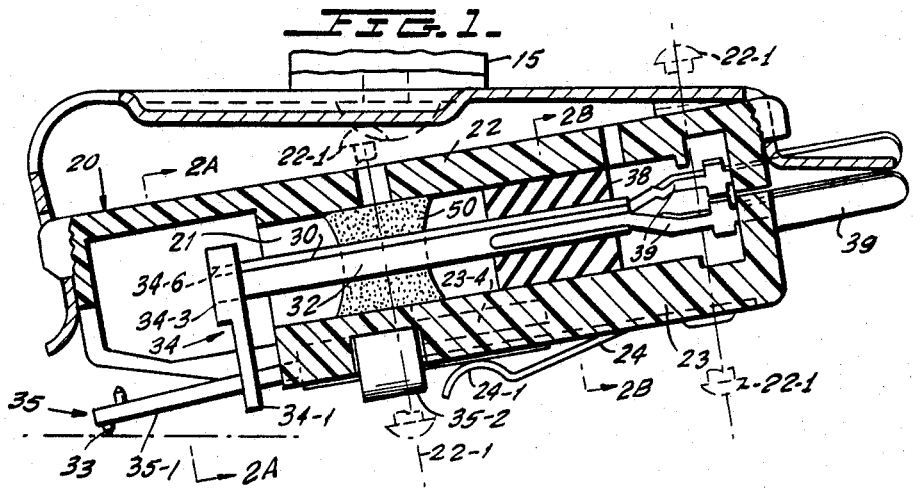
FIG. 1 is a cross-sectional view of a stereophonic phonograph pickup, each channel of which operates with a transducer beam having the small volume damping grease means of the invention.
Figure 2:
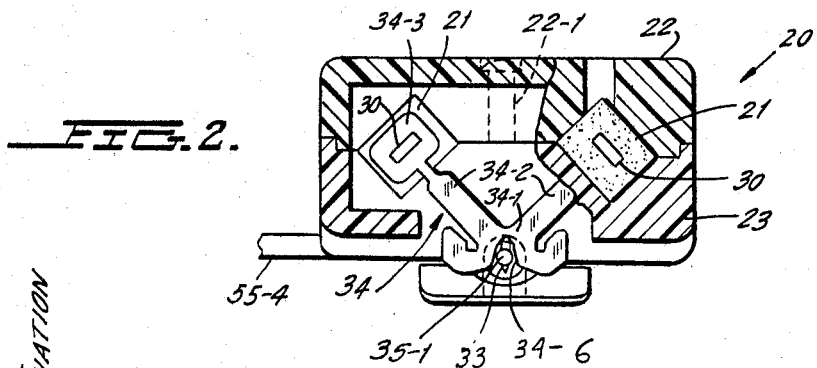
FIG. 2 is a transverse cross-sectional view of the pickup of FIG. 1 with the major cross-section along lines 2a—2a and the right-portion cross-section along lines 2b—2b of FIG. 1.

FIGS. 1 and 2 show an example of a known-type of stereophonic phonograph pickup or cartridge operating with two elongated transducer beams, each of which is combined with a small volume of flowable fluorocarbon polymer grease in accordance with the invention. On a tone arm 10 of a conventional phonograph is mounted with a metal-sheet bracket a stereophonic pickup having a casing or housing 20. The housing 20 has two elongated generally parallel chambers 21 in each of which is operatively held or mounted a known-type elongated thin flat audio-frequency signal transducer beam 30. The specific housing 20 comprises an upper housing wall 22 and a complimentary bottom housing wall 23 which may be affixed with two rivets shown by dash-dot lines 22–1.

Within each elongated housing chamber 21 is operatively mounted or held a thin flat and elongated piezoelectric or piezoresistive vibratory signal transducer beam 30. The piezoelectric transducer beams may be of the type described in the above-identified patents or the similarly dimensioned piezoresistive transducer beams of the type described in copending application Ser. No. 435,300, now U.S. Patent 3,392,358, filed Feb. 25, 1965 by J. F. Collins or U.S. Patent 3,089,108 (Gong et al.). The surface of the rearward region of each chamber region 21 holds conventionally under slight pressure an elastomer body 38 surrounding and holding therein the rear region of each transducer beam 30 with its external metallic terminal strips 39.

One of two groove-engaging styli 33 is connected through a conventional coupling member 34 to the front end 35 of each transducer beam 30. The stylus coupling member 34 may consist of a V-shaped coupler structure of the type described in Keller et al. U.S. Patent 2,114,471 or German Batch Patent 971,346. This stylus coupler 34 has at its bottom a stylus holding or engaging coupling center portion 34–1 with two 90° inclined arms 34–2 (FIG. 2) which are stiff in the direction of their length and have at their outward upper ends two transducer-engaging coupling ends 34–3. The two coupler arms 34–2 are pivotally joined to their central stylus coupler joint 34–1 and to their respective two transducer couplers 34–2 for resolving the composite stylus motion into two 90° displaced motion components transmitted to the two transducers 30 for generating therein two distinct stereophonic signals corresponding to the stereophonic groove undulations driving the stylus 33.

Although the stylus coupler center 34–1 of the stylus coupler 34 may carry the groove engaging stylus 33, the coupler center 34–1 is provided at its downward side with a coupyling recess 34–6 shaped for detachable coupling with a stylus carrying rod 35–1 of a detachable stylus holder 35 of the type disclosed in U.S. Patents 3,236,956 or 2,717,929. The stylus holder 35 has a light forwardly extending stylus rod 35–1 carrying at its front end two differently dimensioned and oppositely directed styli 33. The stylus rod 35–1 is carried in alignment with the trans-ducer coupling axis shown by the generally-parallel stiff or rigid main elongated stylus holder body 35–2 which constitutes its seating section. The stylus seating section 35–2 has a rotary surface shaped for rotation on a corresponding rotary surface of seating recess in the bottom housing wall 23. A handle 35–4 laterally extending from stylus-holder rotary seating section 35–2 serves to rotate the stylus rod 35–1 with its two styli 33 to its different or opposite stylus position. At its rear end stylus holder 35 has a flat-shaped bias section 35–6 with opposite flat surfaces of a known type elastically deformable retainer and bias spring 24, the rear end of which is affixed to bottom housing wall 23 by rearward housing rivet 22–1.

Such transducer beams have a resonant frequency determined by its mass and its stiffness or compliance. When vibrated with or vibrated at or near its resonant frequency a resonant-peak region of the transducer beam 30 will vibrate with an excessive resonant-peak amplitude greatly exceeding its amplitude at frequencies of other parts of its audio-frequency operating range. In the past, an elastomer pad or a large volume of viscoelastic fluid has been applied to the resonant-peak portion of such transducer beams for reducing its excessive disturbing resonant-peak vibratory amplitude and response. However, as explained above, such known prior damping pads and large-volume damping fluids exerted excessive restraining forces on the transducer beam which materially lowered its vibratory amplitude over the desired audio-frequency range.

In accordance with the invention, the excessive resonant-peak vibration amplitude of the transducer beam is reduced to near its normal amplitude by surrounding a portion of its resonant-peak beam length with a limited volume of non-newtonian non-creeping grease-like fluorine containing polymer without materially reducing the beam vibration amplitude and response over the desired audio-frequency range, such as from 3 to 10 kc. (kilocycles) per second.

As examples, the higher-order superiority of transducer beam resonant-peak damping with a small volume of non-creeping halofluorocarbon polymer will be explained in connection with a series of performance tests on different groups of pickup transducer beams described below in connection with the graphs of FIGS. 3 to 6.

Fifty alike stereophonic phonograph pickups of the type described above in connection with FIGS. 1 and 2 have been selected so that each operated with substantially the same frequency response and sensitivity characteristics. The transducer beam consisted of the standard thin and flat piezoelectric ceramic transducer of .625" length and .050" times .020" transverse cross-section. Its surrounding housing compartment was of 0.94" times 0.88" cross-section. The resonant peak amplitude of the transducer beams was damped by placing the damping body on a section of the transducer length expressed in % (percent) of its total length counted from the left front or driven end nodal point of the transducer beam.

The small quantity of flowable non-creeping damping grease used in damping the resonant-peaks of the transducer beam consisted of a halofluorocarbon polymer of the type described in the Textbook of Polymer Science by F. W. Billmeyer, Jr., chapter 16, pages 419–428, Fluorocarbon Polymer, and more specifically, a Halofluorocarbon Polymer described in the chapter section "Polymers Based on Chlorotrifluoroethylene," pages 426 and 427 thereof.

The specific halofluorocarbon polymer grease used in the tests for damping the resonant-peak beam amplitudes consist of a blend of greases which are sold under the trademark KEL–F by the 3-M Company and described in its pamphlet J–OPB (68), copyright 1958. They are low-molecular weight polymers of chlorotrifluoroethylene which form a homologous polymer series of the general formula Cl—(CF₂—CFCl)—Cl. For the purpose of this specification and claims such halofluorocarbon grease is herein called "HFC" grease polymer. The viscosity of the specific blend of such HFC grease used was measured with a standard Brookfield viscometer and had a Brookfield reading of 50 to 70 corresponding to 520 to 680 dynes cm.$^2$ (centimeter square) and plastic viscosity of 44,000 to 64,000 centipoises.

These tests have been performed on different groups of these 50 pickups or cartridges in accordance with the Schedule below:

SCHEDULE

| Pickup group | Quantity of pickup | Damping material | Damping placement along beam length |
|---|---|---|---|
| Group 1 | 5 | 0.03 cc. HFC | 15% beam length. |
| Group 2 | 5 | 0.03 cc. HFC | 30% beam length. |
| Group 3 | 5 | 0.03 cc. HFC | 45% beam length. |
| Group 4 | 5 | 0.03 cc. HFC | 62% beam length. |
| Group 5 | 10 | 17 DURO | 46% beam length. |
| Group 6 | 10 | 35 DURO | Do. |
| Control group | 10 | None | |

Filling holes 25 in the upper casing walls 22 at different percent length of the transducer beam served to flow-in or place the 0.03 cubic centimeter of HFC fluorocarbon grease at the different longitudinal positions of the transducer beam measured from the left front or driven end. The elastomer 17 DURO and 35 DURO dampers of Groups 5 and 6 consisted of 0.060" long butyl pads of the respective durometer hardness which surrounded the transducer beam in a lightly compressed condition as used in the past for damping the resonant peaks of pickup transducer beams.

The following test measurements were made on each of the fifty pickups:

(a) Compliance of transducer.

(b) 1 kc. (kilocycles per second) Sensitivity of the L (left) and R (right) channels with standard test record CBS–STR–100 at a load of 1 megohm and 100 pf. (pico farad or $10^{-12}$ farad) capacity.

(c) Frequency Response of each transducer channel with the same standard test record at load conditions which result in a constant-velocity response, namely, 12 kohm (kilo-ohm), 100 pf. capacity under which an ideal pickup will have a flat or linear response over the entire frequency range.

From these measurements made on all pickups, the following data has been computed and obtained:

A. The merit figure or overall sensitivity efficiency $CV^2$ for each cartridge was computed by averaging the individual Left and Right Channel sensitivities with the individual compliance value. The $CV^2$ values thus obtained were averaged for each of the pickup Groups 1 to 7 of the Schedule, "C" being the compliance and "V" being the voltage output of the channel transducer beam.

The following data was deduced from the frequency response sweep traces of each of the pickup channels:

B. The fundamental "beam" resonant frequency.

C. "Stylus Resonance" frequency, which is that of the effective mass of the stylus tip with compliance of the engaged groove portion.

D. "High Frequency Limit" which is the high frequency at which the channel sensitivity is minus 3 db (—3 db) below that of the .5 kc. or 500 c.p.s. (cycles per second) sensitivity.

E. "Peak Deviation" which is the difference between peak response deviation on opposite sides of the ideal linear or constant-velocity frequency response in the range from 500 to 10,000 c.p.s. (cycles per second).

Left and Right channel values of each of these measured characteristics have been averaged together for each pickup group.

FIGS. 3–6 show graphs of the different performance characteristics of the different tested cartridge groups prepared from the above-described test data.

Figure 3:
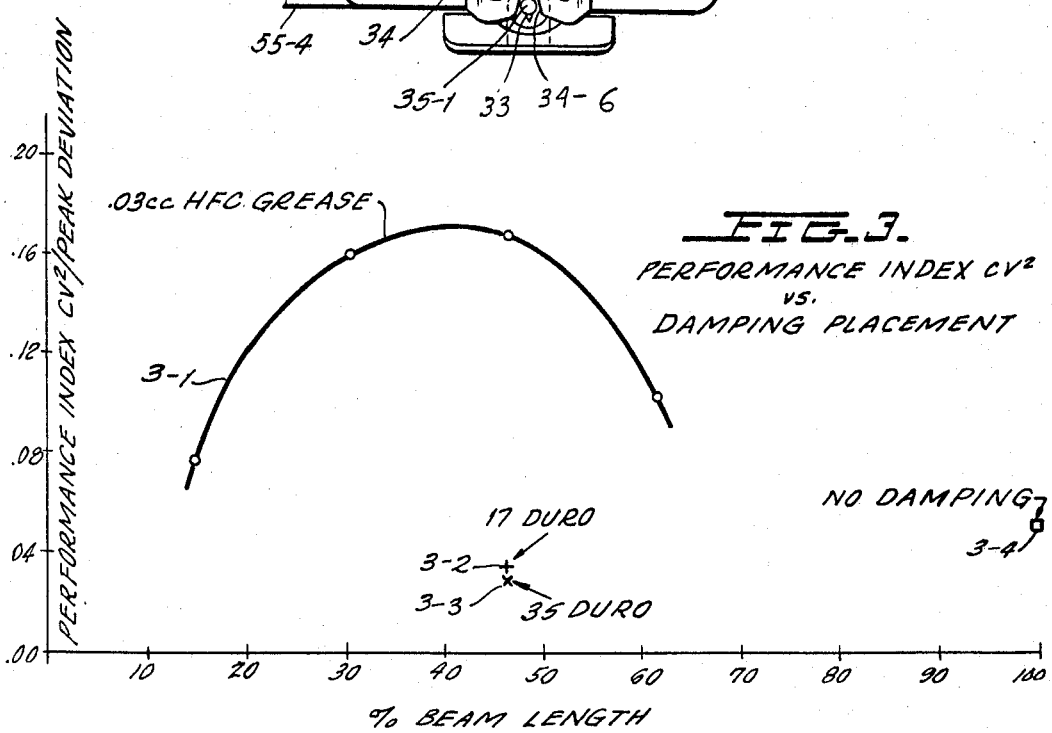
FIG. 3 is a characteristic graph showing the performance index of a pickup transducer beam having the small-volume grease damping of the invention as a function of the damping placement along the beam length which, together with the graphs of FIGS. 4–6, are hereinafter more fully explained.

In FIG. 3, the graph ordinates show the Performance Index or "PI" (which is $CV^2$/Peak Response Deviation from linearity) as a function of damping placement on different portions of beam length. Curve 3–1 shows the performance index PI when 0.03 cc. HFC grease was placed at different longitudinal places on the transducer beam. It is seen that the performance index PI varies little from a mean high value when the HFC grease is placed at different places between 30%, and 55% of the beam length, but that it drops sharply when placed below 30% and above 55% of the beam length. The points 3–2 of 17 DURO and 3—3 of 35 DURO in FIG. 3 show that with 17 DURO and 35 DURO damper pads at 46% beam length the performance index PI is only .026 to .024, whereas it is about .16 with .03 cc. HFC grease placed along 30% to 55% beam length. Point 3–4 shows that the performance index PI is very low, only .04.

Figure 4:
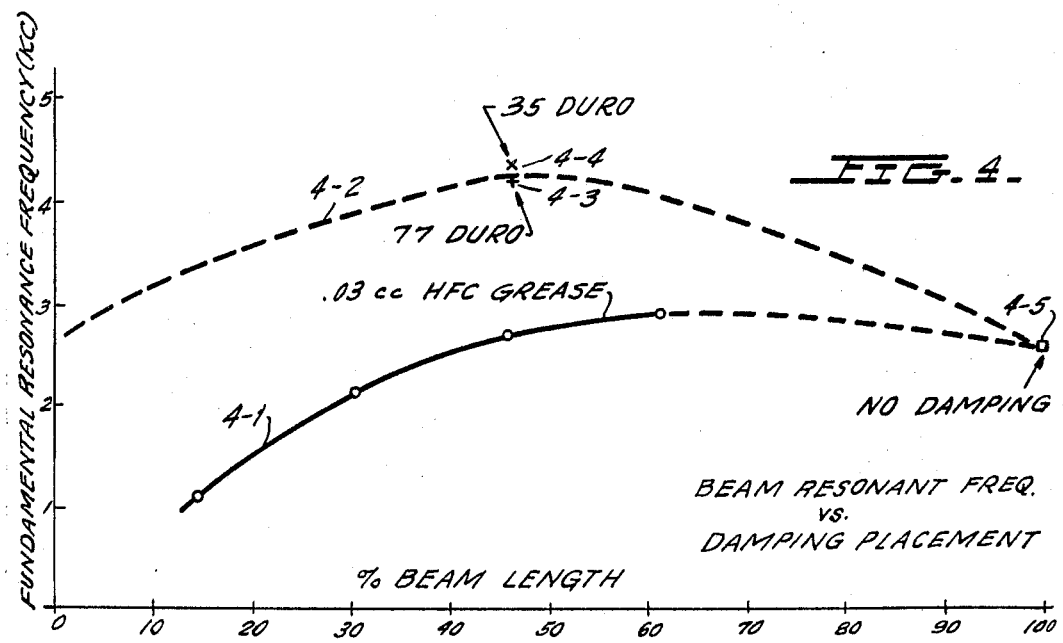
FIG. 4 is a graph showing the fundamental beam resonance frequency as a function of such damping grease placement along the transducer-beam length.

In FIG. 4, the graph ordinates show the fundamental beam resonance in kc. (kilocycles per second) as a function of placing the damping means on different percent longitudinal portions of the transducer beam. Curve 1–4 shows that with 0.03 cc. HFC grease at different places on the transducer beam, its resonant frequency was greatly reduced from its high resonant frequencies of dashline curves 4–2 when 17 DURO and 35 DURO of points 4–3, 4—4 was placed conventionally on the 46% beam-length portion. This great reduction of the fundamental beam resonance seen in curve 4–1 is caused by the small dynamical mass contribution of the .03 cc. HFC grease to that of the beam and the absence of increased beam stiffness that would be contributed by the presence of an elastomer damper body. The point 4–5 shows the beam resonance in absence of beam damping, which gives the disturbing excessive peaked resonance response.

Figure 5:
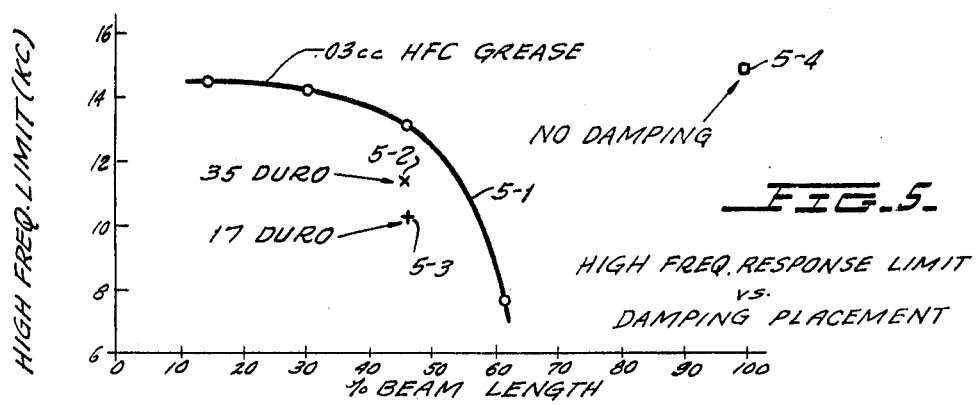
FIG. 5 is a graph showing the high frequency response limit of the transducer beam as a function of the damping grease placement along its length.

In FIG. 5, the graph ordinates show the high frequency response limit of the transducer-beam as a function of damping placement on different percent beam length portions. Curve 5–1 shows that the high frequency limit remains high and changes only from 14.1 kc. to 13.2 kc. when damping placement is shifted from 30% to 44% of beam length. The point 5–2 shows that with DURO 35, the high frequency response limit is only 11.6 kc. and that it drops further to 10.2 kc. with DURO 17 of point 5–3. Although with no damping of point 5–4 the high frequency limit is 15 kc., the response will have the very disturbing excessive resonance response peak.

Figure 6:
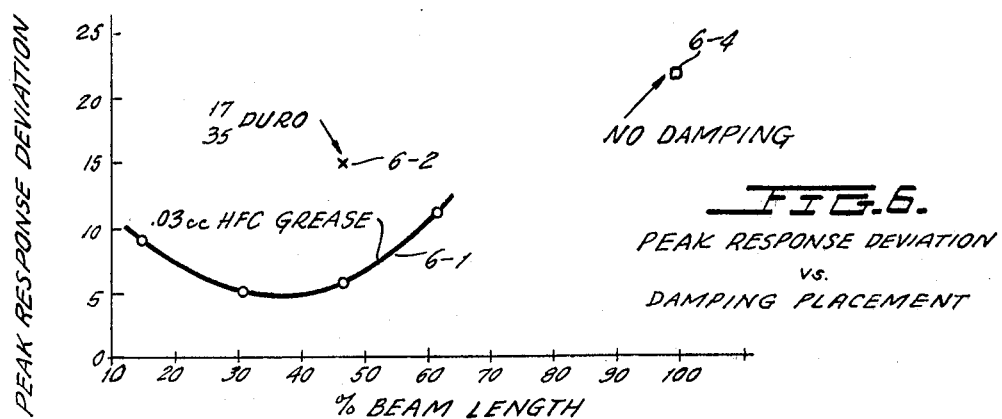
FIG. 6 is a graph showing the peak response deviation from linear response of the transducer beam as a function of the damping grease placement along its length.

In FIG. 6, the graph ordinates show the peak Deviation in db (as above defined) as a function of the damping placement at different percent of the beam length. Curve 6–1 shows this relation when placing 0.03 cc. HFC grease over 15% to 52% beam length, point 6–2, when placing 17 and 35 DURO damping on the 46% beam portion, and point 6–4 in absence of damping. Curve 6–1 shows that placing 0.03 cc. HFC grease along 30% to 46% beam length portions secures about the same level and the lowest peak response deviation of about 6 db. In contrast with DURO's 17 and 35, the peak response damping deviation is 15 db or about twice higher.

These performance characteristics establish that in an audio-frequency transducer device operating with transducer beams using a small volume of non-creeping HFC grease for damping the excessive peak-beam amplitude, the signal response of the transducer beam will follow faithfully the amplitude variations of the stylus while suppressing the excessive and disturbing amplitudes of its resonant-frequency peak beam portion. This applies also to diaphragm coupled transducer devices.

Depending on the cross-section and the stiffness and mass of the transducer beam and the size of cross-section of the surrounding housing chamber portion in which the transducer-peak beam length is located, correspondingly larger or smaller volumes of the HFC grease with correspondingly smaller or larger viscosity ranges will be selected to secure analogous superior response and sensitivity characteristics of the transducer beam.

As is known, the Record Industry Association of America (1 East 57th St., New York, N.Y.) has adopted a Standard Response Curve for phonograph pickups over the frequency range from about 400 to 20 kc. per second, such as shown by curve 7-1 in the FIG. 7 graph of copending U.S. application Ser. No. 494,737, now U.S. Patent 3,426,163, filed Oct. 11, 1965. What was explained above in relation to the performance characteristics of a pickup transducer beam damped by a small volume of flowable HFC grease with respect to its linear response characteristics applies also to its performance characteristics with respect to such Standard Response Curve. Reference is made to printed Data Sheet 091–B Technical Papers on Viscosity Determination and Control, published by Brookfield Engineering Laboratories, Inc., Stoughton, Mass., U.S.A. and the book "Viscosity and Flow Measurement" by Wares, Lyons, Kim and Colwell, published 1963 by John Wiley & Sons, pp. 63–96, 139–150 and 329–389.

The principles underlying the invention described in connection with specific exemplifications will suggest other modifications and applications thereof.

What is claimed is:

1. In an audio-frequency mechanoelectric transducer device,
   a mounting structure having a chamber therein,
   a flat elongated transducer beam having a beam length held in said chamber and operative to transduce vibratory motion of a predetermined wide audio-frequency range between two longitudinally spaced beam length portions into corresponding electric signal response and vice versa,
   a vibratory member coupled to a coupled beam portion for transmitting vibratory motion between them over said frequency range and producing corresponding signal response therebetween,
   said beam having a predetermined resonant frequency causing a limited peak beam portion thereof to vibrate at said resonant frequency with a resonant peak amplitude materially exceeding the linear-velocity vibratory amplitude thereof at frequencies other than said resonant frequency,
   a predetermined limited volume of flowable fluorocarbon polymer having the property of and remaining confined in a certain limited space of said chamber portion along and engaging said peak beam portion and facing chamber surface portions,
   said polymer volume having a predetermined range of viscosity characteristics varying for different shear forces exerted by said peak beam portion and causing said peak beam amplitude to remain near said linear vibratory amplitude at said resonant frequency, and materially lower than obtainable with an elastomer body engaging said peak beam portion for damping said peak-beam-portion amplitude.

2. In an audio-frequency transducer device as claimed in claim 1,
   the performance index $CV^2$ of said transducer beam divided by peak to peak response deviation thereof in decibels from said linear-velocity beam response being at least three times greater than obtainable under otherwise similar conditions with an elastomer damping body tending to materially reduce said excessive peak beam amplitude, wherein C is the compliance and V is the voltage output of said transducer beam.

3. An audio-frequency transducer device as claimed in claim 1, constituting a phonograph pickup,
   a vibratory stylus engageable with a record groove having a driving coupling connection to a vibratory end portion of said transducer beam for producing a corresponding transducer signal response.

4. In a phonograph pickup device as claimed in claim 3,
   the performance index $CV^2$ of said transducer beam divided by peak to peak response deviation thereof in decibels from said linear-velocity beam response being at least three times greater than obtainable under otherwise similar conditions with an elastomer damping body tending to materially reduce said excessive peak beam amplitude, wherein C is the compliance and V is the voltage output of said transducer beam.

5. In a phonograph pickup device as claimed in claim 4,
   said flowable polymer volume being placed along a beam section spaced by about 30% to 55% of the beam length from said coupled beam end.

6. In a phonograph pickup as claimed in claim 3,
   said polymer being essentially a halofluorocarbon polymer.

7. In a phonograph pickup as claimed in claim 3,
   said polymer being essentially a halofluorocarbon polymer,
   the performance index $CV^2$ of said transducer beam divided by peak to peak response deviation thereof in decibels from said linear-velocity beam response being at least three times greater than obtainable under otherwise similar conditions with an elastomer damping body tending to materially reduce said excessive peak beam amplitude, wherein C is the compliance and V is the voltage output of said transducer beam.

8. In a phonograph pickup as claimed in claim 7,
   said yieldable polymer volume being placed along a section of said beam spaced by about 30% to 55% of the beam length from the driven beam end.

9. In a phonograph pickup as claimed in claim 7,
   said polymer being essentially a halofluorocarbon polymer,
   and being placed along a section of said beam spaced about 30%% to 55% of the beam length from the driven beam end.

References Cited
UNITED STATES PATENTS

| | | | |
|---|---|---|---|
| 2,519,185 | 8/1950 | Harris | 179—100.41 |
| 2,594,948 | 4/1952 | Lynch | 179—100.41 |
| 2,879,413 | 3/1959 | Smith-Johannsen | 310—8.2 |
| 3,377,439 | 4/1968 | Rouy | 179—100.4 |

BERNARD KONICK, Primary Examiner

R. F. CARDILLO, JR., Assistant Examiner

U.S. Cl. X.R.

310—8.2, 8.5